US008990815B1

(12) United States Patent
Kalekar

(10) Patent No.: US 8,990,815 B1
(45) Date of Patent: Mar. 24, 2015

(54) SYNCHRONIZING ALLOCATED BLOCKS OF VIRTUAL DISK FILES ACROSS PRIMARY AND SECONDARY VOLUMES BY EXCLUDING UNUSED BLOCKS

(75) Inventor: Santosh Kalekar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 494 days.

(21) Appl. No.: 13/364,290

(22) Filed: Feb. 1, 2012

(51) Int. Cl.
*G06F 12/00* (2006.01)
*G06F 12/16* (2006.01)
*G06F 9/46* (2006.01)
*G06F 9/455* (2006.01)

(52) U.S. Cl.
USPC ............. 718/100; 718/1; 711/161; 711/162; 714/4.11

(58) Field of Classification Search
None
See application file for complete search history.

(56) References Cited

U.S. PATENT DOCUMENTS

| | | | | |
|---|---|---|---|---|
| 7,039,661 | B1* | 5/2006 | Ranade | 707/610 |
| 7,293,154 | B1* | 11/2007 | Karr et al. | 711/202 |
| 7,447,854 | B1* | 11/2008 | Cannon | 711/162 |
| 8,046,550 | B2* | 10/2011 | Feathergill | 711/162 |
| 8,060,476 | B1* | 11/2011 | Afonso et al. | 707/649 |
| 8,135,930 | B1* | 3/2012 | Mattox et al. | 711/162 |
| 8,335,898 | B2* | 12/2012 | Wade et al. | 711/161 |
| 8,683,111 | B2* | 3/2014 | Wade et al. | 711/6 |
| 8,683,156 | B2* | 3/2014 | Bahadure et al. | 711/162 |
| 2007/0226446 | A1* | 9/2007 | Horiuchi et al. | 711/170 |
| 2008/0183988 | A1* | 7/2008 | Qi | 711/162 |
| 2010/0228913 | A1* | 9/2010 | Czezatke et al. | 711/112 |
| 2010/0318991 | A1* | 12/2010 | Venkitachalam et al. | 718/1 |
| 2011/0107025 | A1* | 5/2011 | Urkude et al. | 711/112 |
| 2012/0054306 | A1* | 3/2012 | Vaghani et al. | 709/217 |
| 2012/0079229 | A1* | 3/2012 | Jensen et al. | 711/170 |
| 2012/0179885 | A1* | 7/2012 | Wade et al. | 711/162 |
| 2012/0284707 | A1* | 11/2012 | Janakiraman | 718/1 |
| 2012/0324183 | A1* | 12/2012 | Chiruvolu et al. | 711/162 |
| 2012/0331242 | A1* | 12/2012 | Shaikh et al. | 711/154 |
| 2013/0024722 | A1* | 1/2013 | Kotagiri et al. | 714/6.1 |

OTHER PUBLICATIONS

EMC2 Where Information Lives; Using EMC ClariiOn with Microsoft Hyper-V Server; Jan. 2010.
"Microsoft", www.microsoft.com/en-us/default.aspx, as accessed on Nov. 12, 2014 (Feb. 14, 2009).
"VMware", www.vmware.com, as accessed on Nov. 12, 2014 (Feb. 8, 1999).

* cited by examiner

*Primary Examiner* — Emerson Puente
*Assistant Examiner* — Benjamin Wu
(74) *Attorney, Agent, or Firm* — ALG Intellectual Property, LLC

(57) ABSTRACT

A method for virtual disk usage transparency may include 1) identifying a secondary volume at a secondary site configured for synchronization with a primary volume at a primary site, 2) identifying a set of blocks present within the primary volume but not present within the secondary volume, 3) identifying a virtual disk file within the primary volume, the virtual disk file including at least one block within the set of blocks, 4) determining that the block represents an unused block within a guest file system configured to use the virtual disk file, 5) selecting a subset of the set of blocks to transmit from the primary site to the secondary site, where selecting the subset includes excluding the block from the subset, and 6) transmitting the subset of the set of blocks from the primary site to the secondary site. Various other methods, systems, and computer-readable media are also disclosed.

20 Claims, 7 Drawing Sheets

SYNCHRONIZING ALLOCATED BLOCKS OF VIRTUAL DISK FILES ACROSS PRIMARY AND SECONDARY VOLUMES BY EXCLUDING UNUSED BLOCKS

BACKGROUND

Organizations increasingly rely on virtualization technologies to improve the flexibility, efficiency, and stability of their data centers. One aspect of virtualization involves provisioning virtual machines with virtual disks for data storage.

Virtual disks, like physical disks, may have unallocated space (e.g., unformatted disk regions) and/or unused space (e.g., formatted but unused). By preallocating large quantities of space for a virtual disk file on a host system, an administrator may provide storage space for a guest system that uses the corresponding virtual disk as a storage resource.

System administrators may sometimes migrate and/or replicate data volumes from one location to another in order to increase reliability, perform system maintenance, manage system resources, or improve performance. In some cases, an administrator may synchronize volumes that include virtual disk files. Unfortunately, synchronizing large virtual disk files may consume a significant amount of computing resources, including disk input/output resources, network bandwidth, and/or processing resources. Accordingly, the instant disclosure identifies and addresses a need for systems and methods for virtual disk usage transparency.

SUMMARY

As will be described in greater detail below, the instant disclosure generally relates to systems and methods for virtual disk usage transparency by identifying which blocks within virtual disk files are used by guest systems, which are unused, and then transmitting only used blocks for synchronization. In one example, a computer-implemented method for virtual disk usage transparency may include 1) identifying a secondary volume at a secondary site configured for synchronization with a primary volume at a primary site, 2) identifying a set of blocks present within the primary volume but not present within the secondary volume, 3) identifying a virtual disk file within the primary volume, the virtual disk file including at least one block within the set of blocks, 4) determining that the block represents an unused block within a guest file system configured to use the virtual disk file, 5) selecting a subset of the set of blocks to transmit from the primary site to the secondary site for synchronizing the secondary volume with the primary volume, where selecting the subset includes excluding the block from the subset, and 6) transmitting the subset of the set of blocks from the primary site to the secondary site such that the virtual disk file at the secondary site is logically synchronized with the virtual disk file at the primary site.

In some examples, identifying the virtual disk file may include 1) identifying at least one virtual machine configured to access the primary volume and 2) querying the virtual machine for an identification of at least one virtual disk file stored on the primary volume.

Determining that the block represents an unused block within the guest file system may include any of a variety of steps. For example, determining that the block represents an unused block may include 1) querying the guest file system configured to use the virtual disk file as a virtual disk for a list of used blocks within the virtual disk and 2) determining that the unused block is not within the list of used blocks. Additionally or alternatively, determining that the block represents an unused block may include converting a location of the unused block within the virtual disk location of the block within the virtual disk file. In this example, selecting the subset of the set of blocks to transmit to the secondary site may include converting a location of the block within the virtual disk file to a location of the block within the primary volume. In some examples, determining that the block represents an unused block may include determining that the unused block represents unallocated space within the guest file system and/or allocated free space within the guest file system.

In one example, the computer-implemented method may also include transmitting extent metadata to the secondary site indicating an unused extent of the virtual disk within the guest file system, where the unused extent includes the block. In this example, the computer-implemented method may additionally include allocating, based on the extent metadata, a corresponding block within the virtual disk file on the secondary volume at the secondary site, the block being located at an offset within the virtual disk file on the primary volume and the corresponding block being located at an offset within the virtual disk file on the secondary volume, the block storing a first value and the corresponding block storing a second value different from the first value.

In one embodiment, a system for implementing the above-described method may include an identification module programmed to 1) identify a secondary volume at a secondary site configured for synchronization with a primary volume at a primary site, 2) identify a set of blocks present within the primary volume but not present within the secondary volume, and 3) identify a virtual disk file within the primary volume, the virtual disk file including at least one block within the set of blocks. The system may also include a determination module programmed to determine that the block represents an unused block within a guest file system configured to use the virtual disk file. The system may further include a selection module programmed to select a subset of the set of blocks to transmit from the primary site to the secondary site for synchronizing the secondary volume with the primary volume, wherein selecting the subset includes excluding the block from the subset. The system may additionally include a transmission module programmed to transmit the subset of the set of blocks from the primary site to the secondary site such that the virtual disk file at the secondary site is logically synchronized with the virtual disk file at the primary site. The system may also include at least one processor configured to execute the identification module, the determination module, the selection module, and the transmission module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a secondary volume at a secondary site configured for synchronization with a primary volume at a primary site, 2) identify a set of blocks present within the primary volume but not present within the secondary volume, 3) identify a virtual disk file within the primary volume, the virtual disk file including at least one block within the set of blocks, 4) determine that the block represents an unused block within a guest file system configured to use the virtual disk file, 5) select a subset of the set of blocks to transmit from the primary site to the secondary site for synchronizing the secondary volume with the primary volume, where selecting the subset includes excluding the block from the subset, and 6) transmit the subset of the set of blocks from the primary site to the secondary site such that the virtual disk file at the secondary site is logically synchronized with the virtual disk file at the primary site.

As will be explained in greater detail below, by identifying which blocks within virtual disk files are used by guest systems, which are unused, and then transmitting only used blocks for synchronization, the systems and methods described herein may facilitate effective logical synchronization of virtual disk files without requiring the actual synchronization of irrelevant blocks. Accordingly, these systems and methods may achieve the synchronization of data volumes that include virtual disk files using less time and fewer computing resources.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
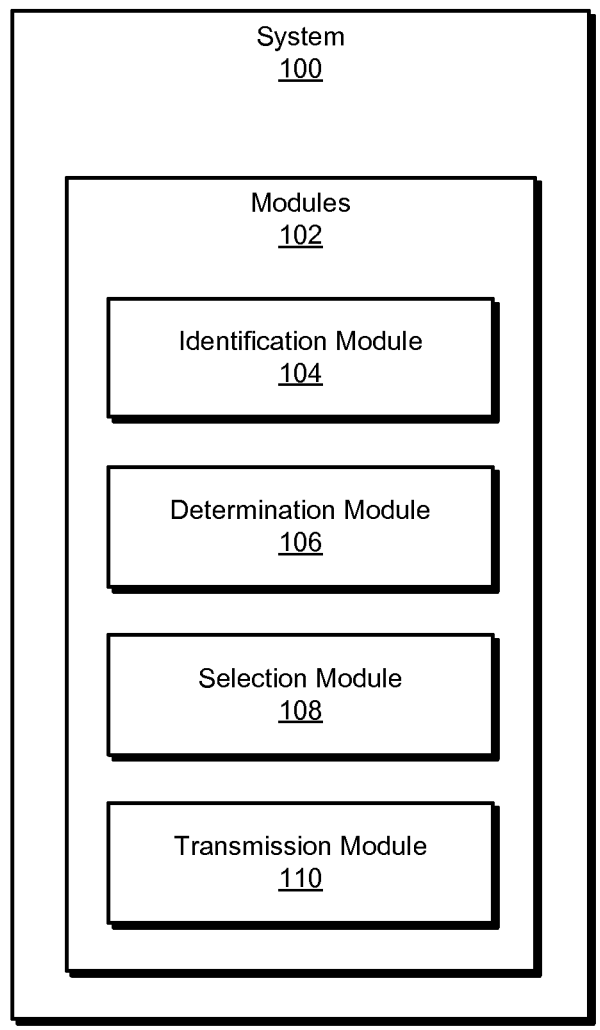
FIG. 1 is a block diagram of an exemplary system for virtual disk usage transparency.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
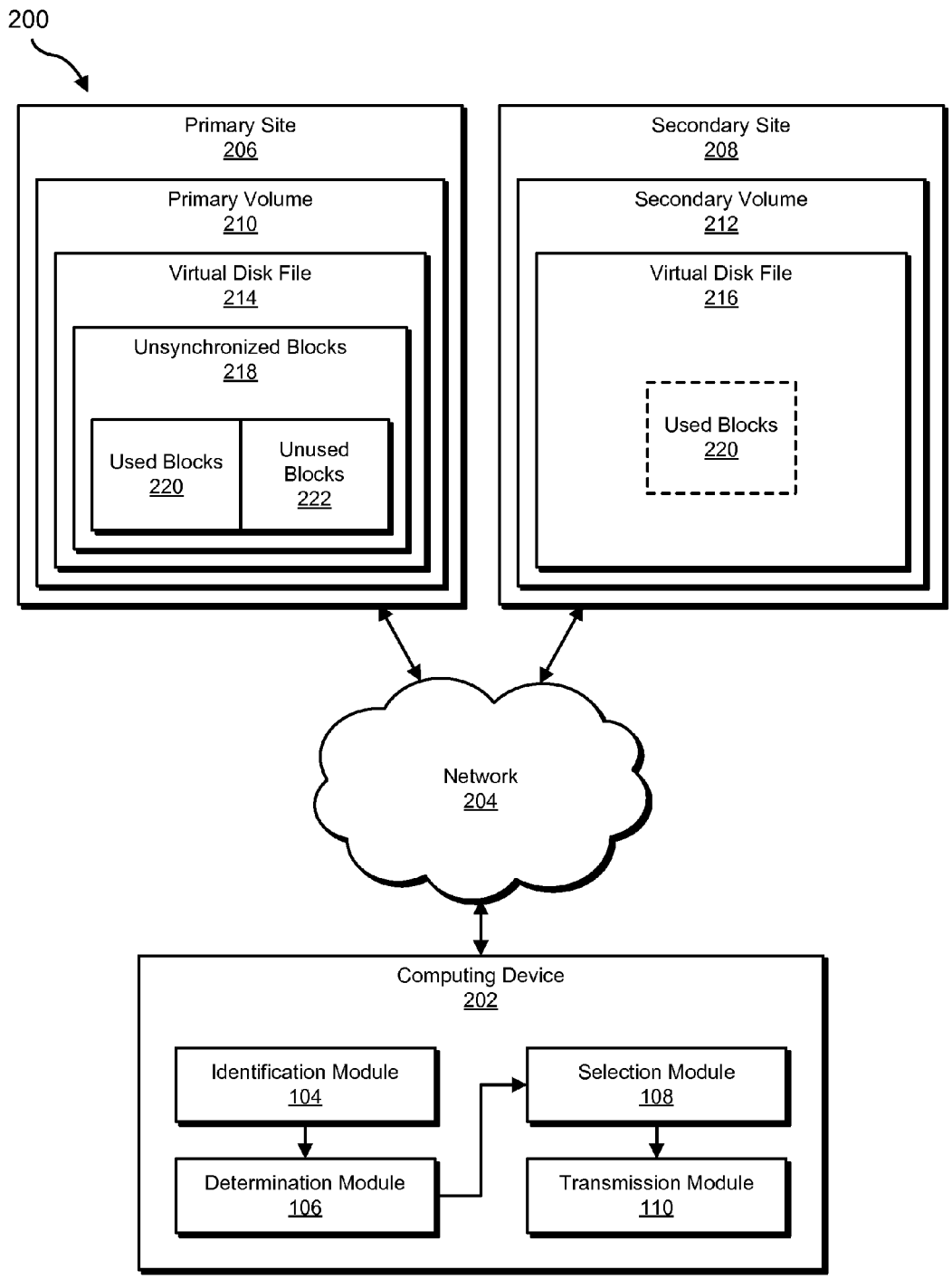
FIG. 2 is a block diagram of an exemplary system for virtual disk usage transparency.
Figure 3:
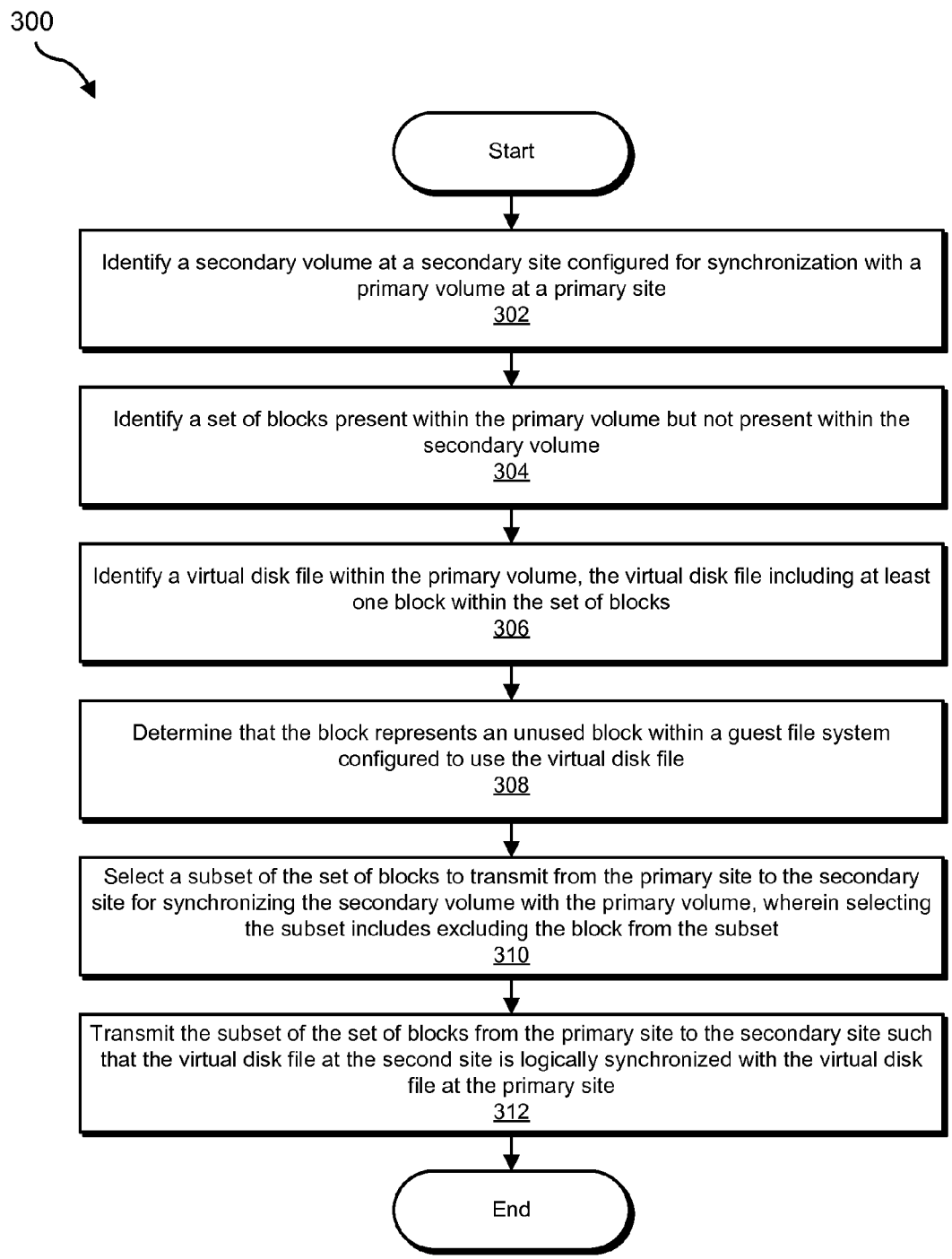
FIG. 3 is a flow diagram of an exemplary method for virtual disk usage transparency.
Figure 4:
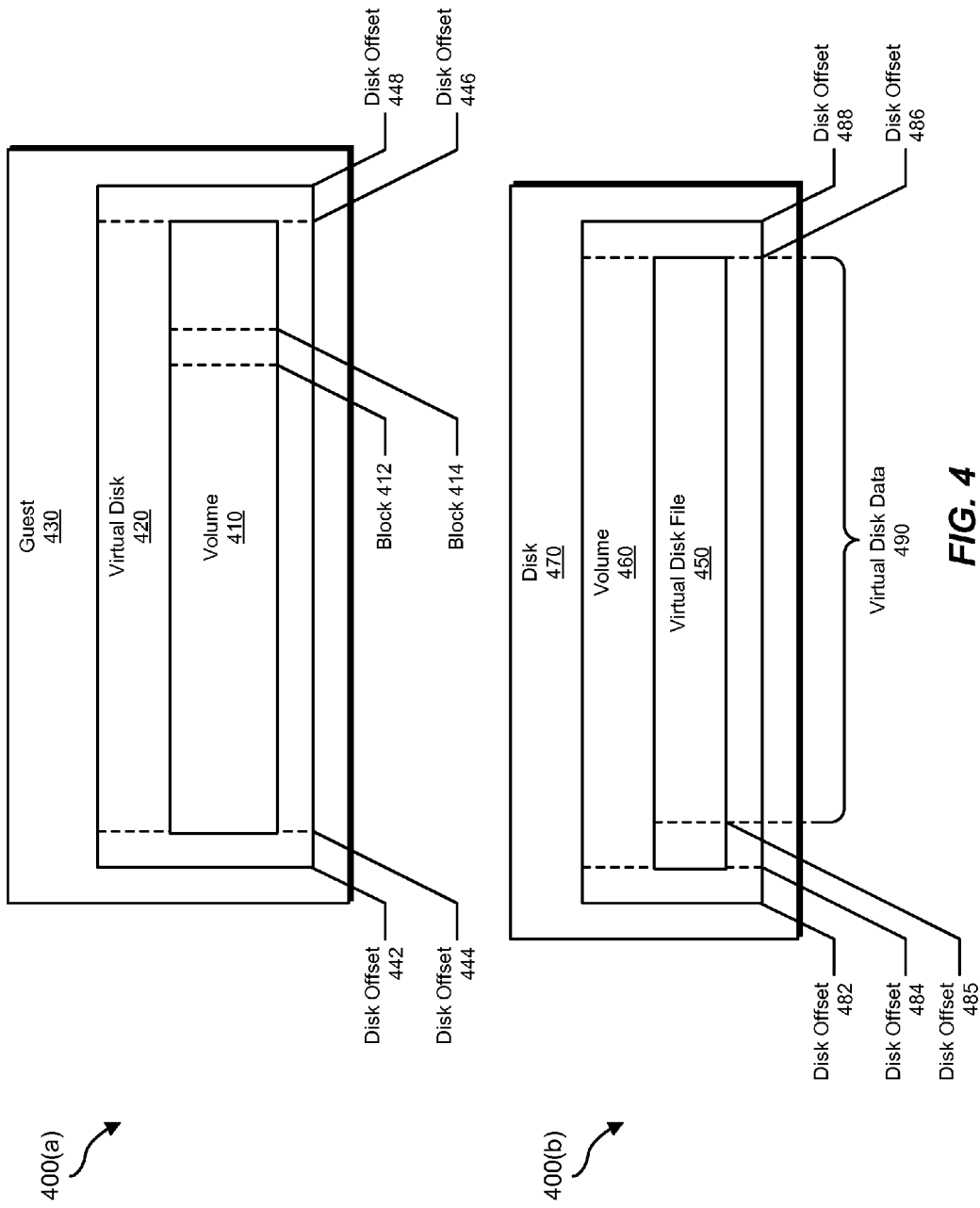
FIG. 4 is a block diagram of an exemplary view of virtual disk usage transparency.

The following will provide, with reference to FIGS. 1, 2, and 4, detailed descriptions of exemplary systems for virtual disk usage transparency. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for virtual disk usage transparency. As illustrated in this figure, exemplary system 100 may include one or more modules 102 for performing one or more tasks. For example, and as will be explained in greater detail below, exemplary system 100 may include an identification module 104 programmed to 1) identify a secondary volume at a secondary site configured for synchronization with a primary volume at a primary site, 2) identify a set of blocks present within the primary volume but not present within the secondary volume, and 3) identify a virtual disk file within the primary volume, the virtual disk file including at least one block within the set of blocks. Exemplary system 100 may also include a determination module 106 programmed to determine that the block represents an unused block within a guest file system configured to use the virtual disk file.

In addition, and as will be described in greater detail below, exemplary system 100 may include a selection module 108 programmed to select a subset of the set of blocks to transmit from the primary site to the secondary site for synchronizing the secondary volume with the primary volume, wherein selecting the subset includes excluding the block from the subset. Exemplary system 100 may also include a transmission module 110 programmed to transmit the subset of the set of blocks from the primary site to the secondary site such that the virtual disk file at the secondary site is logically synchronized with the virtual disk file at the primary site. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, primary site 206, and/or secondary site 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include a computing device 202 in communication with a primary site 206 and a secondary site 208 via a network 204 (e.g., to facilitate a replication, migration, and/or other operation requiring synchronization between primary site 206 and secondary site 208).

In one embodiment, identification module 104, determination module 106, selection module 108, and/or transmission module 110 from FIG. 1 may, when executed by at least one processor of computing device 202, facilitate computing device 202 in virtual disk usage transparency. For example, and as will be described in greater detail below, one or more of modules 102 may cause computing device 202 to 1) identify a secondary volume 212 at a secondary site 208 configured for synchronization with a primary volume 210 at a primary site 206, 2) identify unsynchronized blocks 218 present within primary volume 210 but not present within secondary volume 212, 3) identify virtual disk file 214 within primary volume 210, virtual disk file 214 including unsynchronized blocks 218, 4) determine that unused blocks 222 represent unused blocks within a guest file system configured to use virtual disk file 214, 5) select a subset of unsynchronized blocks 218 to transmit from primary site 206 to secondary site 208 for synchronizing secondary volume 212 with primary volume 210, where selecting the subset includes excluding unused blocks 222 from the subset (e.g., selecting used blocks 220 from unsynchronized blocks 218 to synchronize), and 6) transmit used blocks 220 from primary site 206 to secondary site 208 such that virtual disk file 214 at secondary site 208 is logically synchronized with virtual disk file 216 at primary site 206.

Computing device 202 in FIG. 2 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Primary site 206 in FIG. 2 may represent portions of a single storage or computing device or a plurality of storage or computing devices. For example, primary site 206 may represent a portion of computing system 610 in FIG. 6 and/or portions of exemplary network architecture 700 in FIG. 7. Additionally or alternatively, primary site 206 in FIG. 2 may represent one or more physically separate devices capable of being accessed by a computing device, such as computing system 610 in FIG. 6 and/or portions of exemplary network architecture 700 in FIG. 7.

Secondary site 208 in FIG. 2 may represent portions of a single storage or computing device or a plurality of storage or computing devices. For example, secondary site 208 may represent a portion of computing system 610 in FIG. 6 and/or portions of exemplary network architecture 700 in FIG. 7. Additionally or alternatively, secondary site 208 in FIG. 2 may represent one or more physically separate devices capable of being accessed by a computing device, such as computing system 610 in FIG. 6 and/or portions of exemplary network architecture 700 in FIG. 7.

Network 204 in FIG. 2 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202, primary site 206, and secondary site 208.

FIG. 3 is a flow diagram of an exemplary computer-implemented method 300 for virtual disk usage transparency. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a secondary volume at a secondary site configured for synchronization with a primary volume at a primary site. For example, at step 302 identification module 104 may, as part of computing device 202 in FIG. 2, identify a secondary volume 212 at a secondary site 208 configured for synchronization with a primary volume 210 at a primary site 206.

As used herein, the term "volume" may refer to any distinctly identifiable collection of data. In some examples, the term "volume" may refer to a mirror and/or a plex of data. As used herein, the term "site" may refer to any storage location, including physical storage devices, logical storage devices, storage partitions, storage paths, and/or physical locations of one or more of the same. Accordingly, the phrases "primary site" and "primary volume" may refer to a site and volume configured as a source of a synchronization operation. Likewise, the phrases "secondary site" and "secondary volume" may refer to a site and volume configured as a target of a synchronization operation. In one example, one or more of the systems described herein may synchronize two mirrors within a single datacenter and/or storage subsystem. In another example, one or more of the systems described herein may synchronize two volumes in order to migrate storage from one site to another.

Identification module 104 may identify the secondary volume in any suitable manner. For example, identification module 104 may operate as a part of a volume replication system and identify the target of replication. Additionally or alternatively, identification module 104 may receive a message and/or read a configuration file identifying the secondary volume.

Returning to FIG. 3, at step 304 one or more of the systems described herein may identify a set of blocks present within the primary volume but not present within the secondary volume. For example, at step 304 identification module 104 may, as part of computing device 202 in FIG. 2, identify unsynchronized blocks 218 present within primary volume 210 but not present within secondary volume 212.

As used herein, the term "block" may refer to any discrete unit of data. In some examples, the term "block" may refer to a fixed-size unit of data within a file. For example, the term "block" may refer to a block, a cluster, and/or a sector. Additionally or alternatively, in some examples the term "block" may refer to a variable-size unit of data, such as an extent.

Identification module 104 may identify the set of blocks present within the primary volume but not present within the secondary volume in any suitable manner. For example, identification module 104 may operate as a part of and/or receive a message from an application configured to synchronize the secondary volume to the primary volume and identify blocks not yet synchronized. In some examples, identification module 104 may identify a log of changes performed on the primary volume but not yet replicated to the secondary volume.

Returning to FIG. 3, at step 306 one or more of the systems described herein may identify a virtual disk file within the primary volume, the virtual disk file including at least one block within the set of blocks. For example, at step 306 identification module 104 may, as part of computing device 202 in FIG. 2, identify virtual disk file 214 within primary volume 210, virtual disk file 214 including unsynchronized blocks 218.

As used herein, the phrase "virtual disk file" may refer to any file and/or image containing data stored for the use of a virtual machine. In some examples, the data as stored within the virtual disk file may reflect the raw contents and/or structure of a virtual storage device or "virtual disk." Examples of virtual disk files include, without limitation, a VMWARE VIRTUAL MACHINE DISK file (a "VMDK file") and a VIRTUAL HARD DISK file (a "VHD file"). As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

Identification module 104 may identify the virtual disk file in any suitable manner. For example, identification module 104 may scan the primary volume to identify the virtual disk file (e.g., identifying the virtual disk file based on a name of the virtual disk file, a location of the virtual disk file, and/or contents of the virtual disk file). Additionally or alternatively, identification module 104 may identify the virtual disk file by identifying at least one virtual machine configured to access the primary volume (e.g., for a virtual disk file) and then querying the virtual machine for an identification of at least one virtual disk file stored on the primary volume. As will be explained in greater detail below, by identifying any virtual disk files on the primary volume, the systems and methods described herein may identify unused blocks within virtual disks represented by the virtual disk files.

FIG. 4 illustrates an exemplary view 400(a) of a guest 430 having a virtual disk 420 and an exemplary view 400(b) of a corresponding virtual disk file 450 (e.g., where the contents of volume 410 correspond to virtual disk data 490). As shown in FIG. 4, virtual disk file 450 may be stored on a volume 460 on a disk 470. Using FIG. 4 as an example, at step 306 identification module 104 may identify one or more blocks present on volume 460 but not present within a volume targeted for replication using volume 460 as a source.

Returning to FIG. 3, at step 308 one or more of the systems described herein may determine that the block represents an unused block within a guest file system configured to use the virtual disk file. For example, at step 308 determination module 106 may, as part of computing device 202 in FIG. 2, determine that unused blocks 222 represent unused blocks within a guest file system configured to use virtual disk file 214.

As used herein, the phrase "guest file system" may refer to any file system within a virtual machine and/or capable of reading from a virtual disk represented by a virtual disk file.

Determination module 106 may determine that the block represents an unused block based on any of a variety of criteria. In some examples, determination module 106 may determine that the block represents an unused block by determining that the block represents unallocated space within the guest file system (e.g., space on a virtual disk that is not allocated to any volume and/or partition). Additionally or alternatively, determination module 106 may determine that the block represents an unused block by determining that the block represents allocated free space within the guest file system (e.g., space on a virtual disk allocated to a volume and/or partition but not used for storing a file or other data).

Determination module 106 may determine that the block represents an unused block in any of a variety of ways. For example, determination module 106 may query a guest file system configured to use the virtual disk file as a virtual disk for a list of used blocks within the virtual disk. Determination module 106 may then determine that the unused block is not within the list of used blocks. For example, the virtual machine with the guest file system may include an agent for responding to such queries and determination module 106 may query the agent. Additionally or alternatively, determination module 106 may communicate with the guest file system within the virtual machine through a virtual network interface, via a hypervisor interface, and/or any other suitable means of passing information between a guest file system and a host system.

In some examples, determining that the block that has not yet been synchronized represents an unused block within the virtual disk may include converting a location of the unsynchronized block within the primary volume to a location of the unused block within the virtual disk file (or vice-versa). For example, determination module 106 may convert a location of the unused block within the virtual disk to a location of the block within the virtual disk file. Determination module 106 may then convert a location of the block within the virtual disk file to a location of the block within the primary volume.

Using FIG. 4 as an example, volume 410 may include a block 412 and a block 414. Block 412 may represent a used block within volume 410 and block 414 may represent an unused block within volume 410. As shown in FIG. 4, various locations within virtual disk 420 may be described with disk offset values. For example, disk offsets 442, 444, 446, and 448 may describe various locations within virtual disk 420. In one example, disk offset 442 may indicate a disk offset of 0 (e.g., the beginning of virtual disk 420), disk offset 444 may indicate a disk offset of 100, disk offset 446 may indicate a disk offset of 900, and disk offset 448 may indicate a disk offset of 1000 (e.g., the end of virtual disk 420). In this example, disk offset 444 may also correspond to the beginning of volume 410 within virtual disk 420 (e.g., with a logical cluster number of 0) and disk offset 446 may also correspond to the end of volume 410 (e.g., with a logical cluster number of 800).

Likewise, various locations within disk 470 may be described with disk offset values. For example, disk offsets 482, 484, 485, 486, and 488 may describe various locations within disk 470. In one example, disk offset 482 may correspond to a disk offset of 1000, disk offset 484 may correspond to a disk offset of 2000, disk offset 485 may correspond to a disk offset of 2500, disk offset 486 may correspond to a disk offset of 3500, and disk offset 488 may correspond to a disk offset of 4000. In this example, disk offset 482 may also correspond to the beginning of volume 460 within disk 470 (e.g., with a logical cluster number of 0), disk offset 484 may also correspond to the beginning of virtual disk file 450 within volume 460 (e.g., at a logical cluster number of 1000), disk offset 485 may correspond to the ending of a virtual disk file header of virtual disk file 450 (e.g., at logical cluster number of 1500), disk offset 486 may correspond to the ending of virtual disk file 450 within volume 460 (e.g., at a logical cluster number of 2500), and disk offset 488 may correspond to the ending of volume 460 within disk 470 (e.g., at a logical cluster number of 3000). Since disk offset 484 may mark the beginning of virtual disk file 450, it may correspond to a virtual cluster number 0 of the virtual disk file 450. Likewise, the end of the header of virtual disk file 450 at disk offset 485 may correspond to a virtual cluster number 500 of virtual disk file 450, and the end of virtual disk file 450 at disk offset 486 may correspond to a virtual cluster number 1500.

In the example provided above, determination module 106 may translate a logical cluster number of block 412 (e.g., logical cluster number 728) within volume 410 to a disk offset of virtual disk 420 (e.g., disk offset 828) by adding disk offset 444 (e.g., 100) to the logical cluster number. Determination module 106 may then translate the (virtual) disk offset number of block 412 to a virtual cluster number of block 412 within virtual disk file 450 (e.g., virtual cluster number 1228) by adding the difference between disk offset 485 and disk offset 484 (e.g., the size of the header of virtual disk file 450). Determination module 106 may then translate the virtual cluster number of block 412 to a logical cluster number of block 412 within volume 460 (e.g., logical cluster number 2228) by adding the logical cluster number of volume 460 at disk offset 484 (e.g., corresponding to the offset at which virtual disk file 450 begins within volume 460). In some examples, determination module 106 may then translate the logical cluster number of block 412 within volume 460 to a disk offset of block 412 within disk 470 by adding the value of disk offset 482 (e.g., 1000), resulting in a disk offset value of 3228 for block 412 within disk 470. Additionally or alternatively, determination module 106 may perform a similar process to determine the disk offset value of block 414 within disk 470.

Returning to FIG. 3, at step 310 one or more of the systems described herein may select a subset of the set of blocks to transmit from the primary site to the secondary site for synchronizing the secondary volume with the primary volume, where selecting the subset includes excluding the block from the subset. For example, at step 310 selection module 108 may, as part of computing device 202 in FIG. 2, select a subset of unsynchronized blocks 218 to transmit from primary site 206 to secondary site 208 for synchronizing secondary volume 212 with primary volume 210, where selecting the subset includes excluding unused blocks 222 from the subset (e.g., selecting used blocks 220 from unsynchronized blocks 218 to synchronize).

Selection module 108 may select the subset excluding the unsynchronized, unused blocks in any of a variety of ways. For example, selection module 108 may identify the location of each used (and unsynchronized) block within the virtual disk file and select those blocks. Alternatively, selection module 108 may begin with a selection including a map of (or group of extents describing) all unsynchronized blocks within the virtual disk file and identify the location of each unused block within the virtual disk file to remove them from the selection.

Returning to FIG. 3, at step 312 one or more of the systems described herein may transmit the subset of the set of blocks from the primary site to the secondary site such that the virtual disk file at the secondary site is logically synchronized with the virtual disk file at the primary site. For example, at step 312 transmission module 110 may, as part of computing device 202 in FIG. 2, transmit used blocks 220 from primary site 206 to secondary site 208 such that virtual disk file 214 at secondary site 208 is logically synchronized with virtual disk file 216 at primary site 206.

Transmission module 110 may transmit the subset of blocks in any suitable manner. In some examples, transmission module 110 may execute an operation to transmit the subset of blocks to the secondary site. Additionally or alternatively, transmission module 110 may provide information identifying the subset of blocks to a volume replicator and/or a data movement service and/or appliance. For example, one or more of the systems described herein may create an exclusion rule to prevent a volume replicator and/or data movement system to operate directly on virtual disk files within the primary volume. Transmission module 110 may then provide the subset of blocks to ensure that only logically relevant portions of the virtual disk file are synchronized.

In some examples, transmission module 110 may also transmit extent metadata to the secondary site indicating an unused extent of the virtual disk file within the guest file system that includes the block. In these examples, transmission module 110 may also allocate, based on the extent metadata, a corresponding block within the virtual disk file on the secondary volume at the secondary site. The block may be located at an offset within the virtual disk file on the primary volume and the corresponding block may be located at the same offset within the virtual disk file on the secondary volume. In these examples, the block may store one value and the corresponding block may store a different value because the systems and methods described herein may have excluded the block from synchronization. However, because the respective values of the unused block and the unused corresponding block may be logically irrelevant, the virtual disk files on the primary and secondary volumes may be effectively synchronized.

In some examples, transmission module 110 may transmit the subset of blocks to the secondary site while the primary site is online (e.g., while a virtual machine has the virtual disk file mounted). In these examples, transmission module 110 may serialize input/output operations on the virtual disk file and transmission operations to avoid data corruption.

As described above, one or more of the systems and methods described herein may identify one or more unused blocks within a virtual disk and identify the corresponding location of one or more logically irrelevant blocks within a virtual disk file used to store the contents of the virtual disk. In some examples, as described above, these systems and methods may skip these logically irrelevant blocks when synchronizing volumes containing virtual disk files.

In some additional examples, these systems and methods may, after identifying logically irrelevant blocks of a virtual disk file, identify the logically irrelevant blocks to one or more other systems configured to improve the efficiency and/or performance of a computing system in relation to a volume of data by identifying unused blocks within the volume of data. For example, these systems and methods may identify the logically irrelevant blocks to a reclamation system for thin-provisioned volumes.

Figure 5:
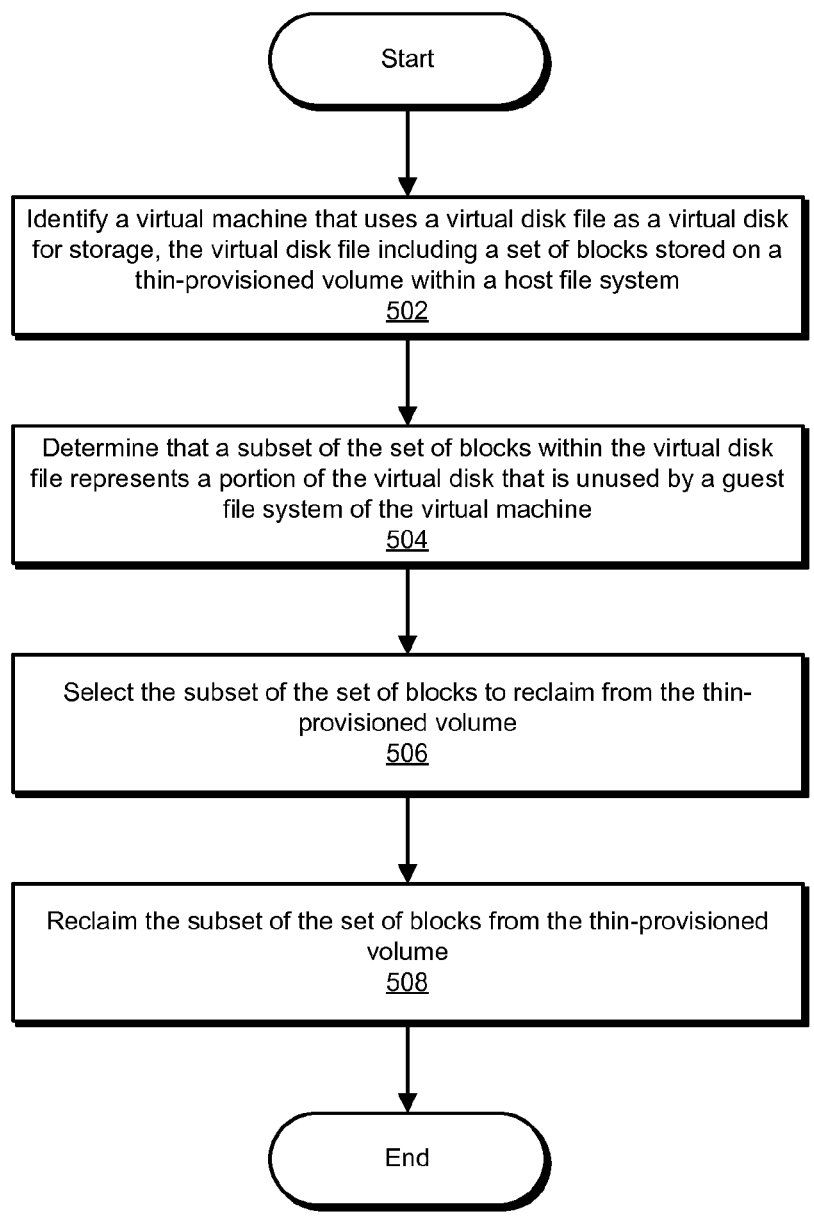
FIG. 5 is a flow diagram of an exemplary method for virtual disk usage transparency.

FIG. 5 is a flow diagram of an exemplary computer-implemented method 500 for reclaiming storage space from virtual disk files. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

At step 502, one or more of the systems and methods described herein (e.g., identification module 104) may identify a virtual machine that uses a virtual disk file as a virtual disk for storage, the virtual disk file comprising a set of blocks stored on a thin-provisioned volume within a host file system. Identification module 104 may identify the virtual machine and/or the virtual disk file in any suitable manner. For example, identification module 104 may use any of the techniques described earlier in connection with step 302, including identifying at least one virtual machine configured to access the volume and then querying the virtual machine for an identification of at least one virtual disk file stored on the volume.

At step 504, after identifying the virtual machine and/or virtual disk file, one or more of the systems described herein (e.g., determination module 106) may then determine that a subset of the set of blocks within the virtual disk file represents a portion of the virtual disk that is unused by a guest file system of the virtual machine. For example, determination module 104 may use any of the techniques described earlier in connection with step 308.

In one example, determination module 106 may query the guest file system configured to use the virtual disk file as a virtual disk for a list of used blocks within the virtual disk and then determining that the subset of blocks is not within the list of used blocks. In another example, determination module 106 may convert a location of each block within the subset of blocks within the virtual disk to a corresponding location of each block within the virtual disk file.

At step 506, one or more of the systems described herein (e.g., selection module 108) may select the subset of the set of blocks to reclaim from the thin-provisioned volume. One or more of the systems described herein may then, at step 508, reclaim the subset of the set of blocks from the thin-provisioned volume. For example, one or more of the systems described herein may submit the subset of blocks to a reclamation subsystem configured to manage the thin-provisioned volume.

In some examples, these systems may reclaim the subset of blocks to from the thin-provisioned volume while the thin-provisioned volume is online (e.g., while a virtual machine has the virtual disk file mounted). In these examples, these systems may serialize input/output operations on the virtual disk file and reclamation operations to avoid data corruption.

As explained above, by identifying which blocks within virtual disk files are used by guest systems, which are unused, and then transmitting only used blocks for synchronization, the systems and methods described herein may facilitate effective logical synchronization of virtual disk files without requiring the actual synchronization of irrelevant blocks. Accordingly, these systems and methods may achieve the synchronization of data volumes that include virtual disk files using less time and fewer computing resources.

Figure 6:
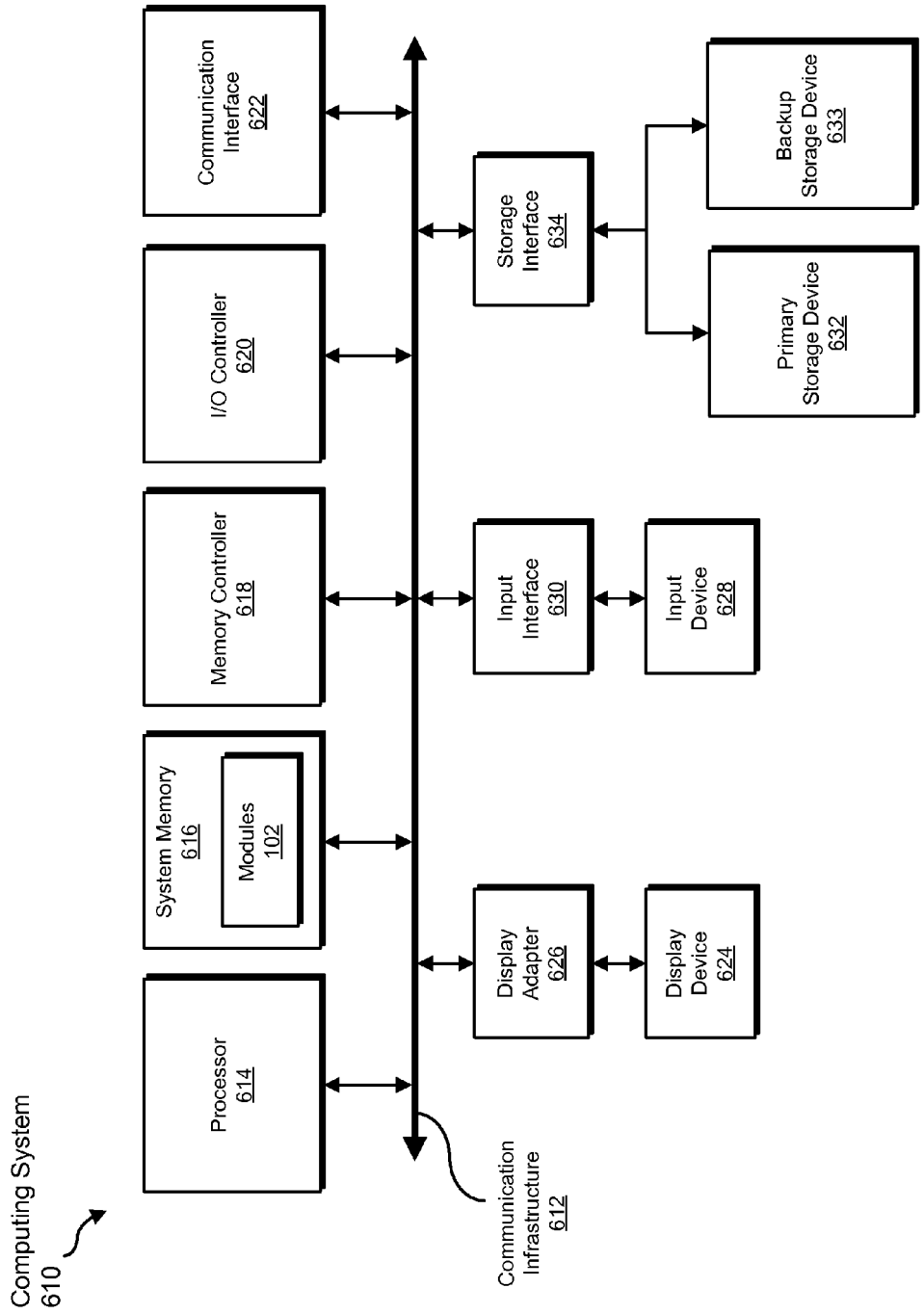
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, querying, determining, converting, selecting, transmitting, and allocating steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
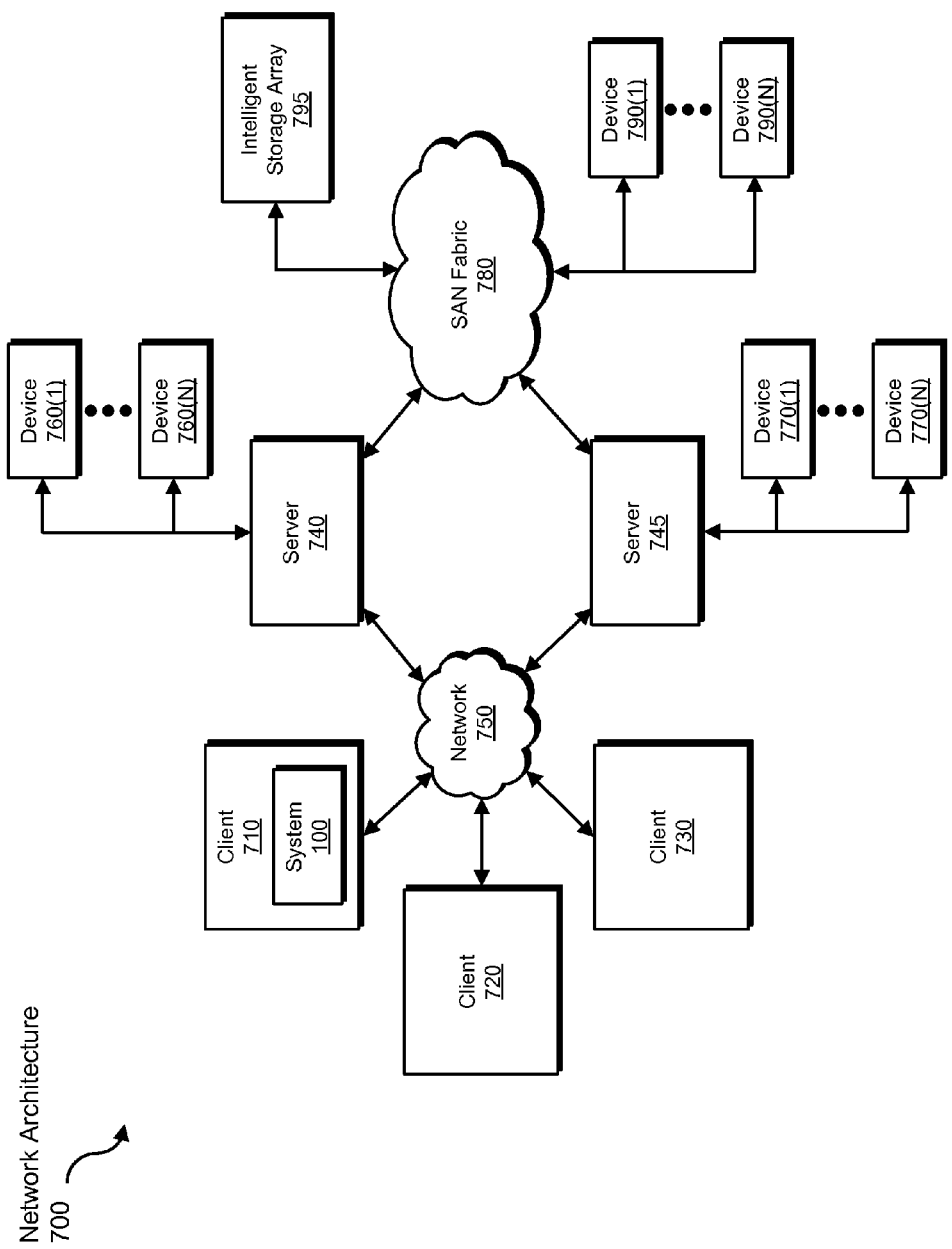
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, querying, determining, converting, selecting, transmitting, and allocating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for virtual disk usage transparency.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for synchronizing data volumes. As another example, one or more of the modules recited herein may transform a volume into a volume that is logically synchronized with but not identical to a source volume.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating virtual disk usage transparency, wherein at least a portion of the method is performed by a computing device comprising at least one processor, the method comprising:
   identifying a secondary volume at a secondary site configured for synchronization with a primary volume at a primary site;
   identifying a set of blocks present within the primary volume but not present within the secondary volume;
   identifying a virtual disk file within the primary volume, the virtual disk file comprising at least one block within the set of blocks;
   determining that the at least one block represents an unused block within a guest file system configured to use the virtual disk file;
   creating an exclusion rule to prevent a data movement system from operating directly on the virtual disk file within the primary volume;
   selecting a subset of the set of blocks to transmit from the primary site to the secondary site for synchronizing the secondary volume with the primary volume, wherein selecting the subset of the set of blocks comprises excluding the at least one block from the subset of the set of blocks; and
   providing the data movement system with the subset of the set of blocks from the primary site to enable the data movement system to transmit the subset of the set of blocks from the primary site to the secondary site such that the virtual disk file at the secondary site is logically synchronized with the virtual disk file at the primary site.

2. The computer-implemented method of claim 1, wherein identifying the virtual disk file comprises:
   identifying at least one virtual machine configured to access the primary volume;
   querying the virtual machine for an identification of at least one virtual disk file stored on the primary volume.

3. The computer-implemented method of claim 1, wherein determining that the at least one block represents the unused block within the guest file system comprises:
   querying the guest file system configured to use the virtual disk file as a virtual disk for a list of used blocks within the virtual disk;
   determining that the unused block is not within the list of used blocks.

4. The computer-implemented method of claim 3, wherein determining that the at least one block represents the unused block within the guest file system comprises converting a location of the unused block within the virtual disk to a location of the at least one block within the virtual disk file.

5. The computer-implemented method of claim 4, wherein selecting the subset of the set of blocks to transmit from the primary site to the secondary site comprises converting a location of the at least one block within the virtual disk file to a location of the at least one block within the primary volume.

6. The computer-implemented method of claim 3, wherein:
   the virtual disk file does not directly correspond to an underlying host system of the virtual disk file;
   querying the guest file system comprises communicating with the guest file system through a virtual network interface that passes the list of used blocks between the guest file system and the underlying host system.

7. The computer-implemented method of claim 1, wherein determining that the at least one block represents the unused block within the guest file system comprises determining that the at least one block represents at least one of:
   unallocated space within the guest file system;
   allocated free space within the guest file system.

8. The computer-implemented method of claim 1, further comprising transmitting extent metadata to the secondary site indicating an unused extent of the virtual disk file within the guest file system, the unused extent comprising the at least one block.

9. The computer-implemented method of claim 8, further comprising allocating, based on the extent metadata, a corresponding block within the virtual disk file on the secondary volume at the secondary site, the at least one block being located at an offset within the virtual disk file on the primary volume and the corresponding block being located at an offset within the virtual disk file on the secondary volume, the at least one block storing a first value and the corresponding block storing a second value different from the first value.

10. The computer-implemented method of claim 1, wherein the virtual disk file comprises a set of blocks stored on a thin-provisioned volume, further comprising:
   identifying the at least one block to a reclamation system that manages the thin-provisioned volume;
   determining that the set of blocks stored on the thin-provisioned volume comprises the at least one block;
   selecting the at least one block to reclaim from the thin-provisioned volume;
   reclaiming the at least one block from the thin-provisioned volume.

11. The computer-implemented method of claim 10, wherein the thin-provisioned volume comprises the primary volume.

12. A system for facilitating virtual disk usage transparency, the system comprising:
   an identification module programmed to:
      identify a secondary volume at a secondary site configured for synchronization with a primary volume at a primary site;
      identify a set of blocks present within the primary volume but not present within the secondary volume;
      identify a virtual disk file within the primary volume, the virtual disk file comprising at least one block within the set of blocks;
   a determination module programmed to determine that the at least one block represents an unused block within a guest file system configured to use the virtual disk file;
   a selection module programmed to:
      create an exclusion rule to prevent a data movement system from operating directly on the virtual disk file within the primary volume;
      select a subset of the set of blocks to transmit from the primary site to the secondary site for synchronizing the secondary volume with the primary volume, wherein selecting the subset of the set of blocks comprises excluding the at least one block from the subset of the set of blocks;
   a transmission module programmed to provide the data movement system with the subset of the set of blocks from the primary site to enable the data movement system to transmit the subset of the set of blocks from the primary site to the secondary site such that the virtual disk file at the secondary site is logically synchronized with the virtual disk file at the primary site; and
   at least one processor configured to execute the identification module, the determination module, the selection module, and the transmission module.

13. The system of claim 12, wherein the identification module is programmed to identify the virtual disk file by:
   identifying at least one virtual machine configured to access the primary volume;
   querying the virtual machine for an identification of at least one virtual disk file stored on the primary volume.

14. The system of claim 12, wherein the determination module is programmed to determine that the at least one block represents the unused block within the guest file system by:
   querying the guest file system configured to use the virtual disk file as a virtual disk for a list of used blocks within the virtual disk;
   determining that the unused block is not within the list of used blocks.

15. The system of claim 14, wherein the determination module is programmed to determine that the at least one block represents the unused block within the guest file system by converting a location of the unused block within the virtual disk to a location of the at least one block within the virtual disk file.

16. The system of claim 15, wherein the selection module is programmed to select the subset of the set of blocks to transmit from the primary site to the secondary site by converting a location of the at least one block within the virtual disk file to a location of the at least one block within the primary volume.

17. The system of claim 12, wherein the determination module is programmed to determine that the at least one block represents the unused block within the guest file system by determining that the at least one block represents at least one of:
   unallocated space within the guest file system;
   allocated free space within the guest file system.

18. The system of claim 12, wherein the transmission module is further programmed to transmit extent metadata to the secondary site indicating an unused extent of the virtual disk file within the guest file system, the unused extent comprising the at least one block.

19. The system of claim 18, wherein the transmission module is further programmed to allocate, based on the extent metadata, a corresponding block within the virtual disk file on the secondary volume at the secondary site, the at least one block being located at an offset within the virtual disk file on the primary volume and the corresponding block being located at an offset within the virtual disk file on the secondary volume, the at least one block storing a first value and the corresponding block storing a second value different from the first value.

20. A non-transitory computer-readable medium comprising computer-readable instructions that when executed by at least one processor of a computing device, cause the computing device to:
   identify a secondary volume at a secondary site configured for synchronization with a primary volume at a primary site;
   identify a set of blocks present within the primary volume but not present within the secondary volume;
   identify a virtual disk file within the primary volume, the virtual disk file comprising at least one block within the set of blocks;
   determine that the at least one block represents an unused block within a guest file system configured to use the virtual disk file;
   create an exclusion rule to prevent a data movement system from operating directly on the virtual disk file within the primary volume;
   select a subset of the set of blocks to transmit from the primary site to the secondary site for synchronizing the secondary volume with the primary volume, wherein selecting the subset of the set of blocks comprises excluding the at least one block from the subset of the set of blocks; and
   provide the data movement system with the subset of the set of blocks from the primary site to enable the data movement system to transmit the subset of the set of blocks from the primary site to the secondary site such that the virtual disk file at the secondary site is logically synchronized with the virtual disk file at the primary site.

* * * * *

UNITED STATES PATENT AND TRADEMARK OFFICE
CERTIFICATE OF CORRECTION

| | | |
|---|---|---|
| PATENT NO. | : 8,990,815 B1 | |
| APPLICATION NO. | : 13/364290 | |
| DATED | : March 24, 2015 | |
| INVENTOR(S) | : Santosh Kalekar | |

It is certified that error appears in the above-identified patent and that said Letters Patent is hereby corrected as shown below:

Claims

Claim 20, at column 19, lines 8 to 11, should read:
A non-transitory computer-readable medium comprising computer-readable instructions that, when executed by at least one processor of a computing device, cause the computing device to:

Signed and Sealed this
Thirteenth Day of October, 2015

Michelle K. Lee
*Director of the United States Patent and Trademark Office*